United States Patent
Ellringmann et al.

(10) Patent No.: US 9,260,637 B2
(45) Date of Patent: *Feb. 16, 2016

(54) PRESSURE-SENSITIVE ADHESIVES FOR BONDING PRINTING PLATES

(71) Applicant: tesa SE, Hamburg (DE)

(72) Inventors: Kai Ellringmann, Hamburg (DE); Marco Kupsky, Quickborn (DE)

(73) Assignee: tesa SE, Nordestedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,080

(22) Filed: Dec. 31, 2014

(65) Prior Publication Data

US 2015/0114558 A1 Apr. 30, 2015

Related U.S. Application Data

(62) Division of application No. 12/717,183, filed on Mar. 4, 2010, now Pat. No. 8,962,777.

(30) Foreign Application Priority Data

Mar. 6, 2009 (DE) .......................... 10 2009 011 482

(51) Int. Cl.
*C09J 133/08* (2006.01)
*C08F 120/06* (2006.01)
*B32B 37/12* (2006.01)
*B41N 6/02* (2006.01)

(52) U.S. Cl.
CPC .............. *C09J 133/08* (2013.01); *B32B 37/12* (2013.01); *B41N 6/02* (2013.01); *C08F 120/06* (2013.01); *C09J 2201/606* (2013.01)

(58) Field of Classification Search
CPC .... C08F 120/06; C08F 220/10; C09J 133/08; B32B 37/12; B41B 6/02
USPC ................. 526/318.44, 317.1, 328.5
See application file for complete search history.

(56) References Cited

U.S. PATENT DOCUMENTS

| | | | |
|---|---|---|---|
| 5,623,011 A | 4/1997 | Bernard | |
| 8,962,777 B2 | 2/2015 | Ellringmann et al. | |
| 2002/0098347 A1* | 7/2002 | Szonn | B32B 25/08 428/343 |
| 2003/0235686 A1 | 12/2003 | Caspari et al. | |
| 2005/0064181 A1 | 3/2005 | Blank et al. | |
| 2008/0044611 A1 | 2/2008 | Husemann et al. | |
| 2008/0131634 A1* | 6/2008 | Kiuchi | B32B 1/08 428/34.9 |
| 2009/0277562 A1 | 11/2009 | Ellringmann et al. | |
| 2011/0166311 A1 | 7/2011 | Ellringmann et al. | |
| 2015/0114558 A1 | 4/2015 | Ellringmann et al. | |

FOREIGN PATENT DOCUMENTS

| | | |
|---|---|---|
| CA | 2 273 493 A1 | 7/1998 |
| DE | 42 02 071 A1 | 7/1993 |
| DE | 43 03 616 C1 | 8/1994 |
| DE | 196 54 177 A1 | 6/1998 |
| DE | 102 18 570 A1 | 11/2003 |
| DE | 103 14 898 A1 | 8/2004 |
| DE | 10 2004 044 084 A1 | 3/2006 |
| EP | 0 760 389 A | 3/1997 |
| EP | 2 116 584 | 11/2009 |
| JP | 10-338845 A | 12/1998 |
| JP | 2002-105415 A | 4/2002 |
| JP | 2004 268447 | 9/2004 |
| JP | 2005 232330 | 9/2005 |
| JP | 2007-126606 A | 5/2007 |
| JP | 2009-234012 A | 10/2009 |
| JP | 2009-270111 A | 11/2009 |
| JP | 2010-215907 A | 9/2010 |
| WO | 03/057497 A | 7/2003 |
| WO | 2004/067661 A2 | 8/2004 |
| WO | 2010 028976 A1 | 3/2010 |

OTHER PUBLICATIONS

English translation of JP Office Action dated Jan. 30, 2014.
J. Brandrup et al., Polymer Handbook, Fourth Edit., vol. 1, J. Wiley & Sons, Hoboken, New Jersey, 1999, pp. VI/193 and 198-200.
English translation of Official Action issued Oct. 7, 2015 in corresponding application JP 2014-169150.

* cited by examiner

*Primary Examiner* — Michael M Bernshteyn
(74) *Attorney, Agent, or Firm* — Norris McLaughlin & Marcus, P.A.

(57) ABSTRACT

Crosslinked pressure-sensitive adhesive comprising at least one base polymer component obtainable by free-radical copolymerization of the following monomers:
a) linear acrylic esters having 2 to 10 C atoms in the alkyl radical,
b) branched, non-cyclic acrylic esters having a glass transition temperature $T_g$ (based on the DSC measurement to DIN 53765) of not more than −20° C.,
c) 8% to 15% by weight of acrylic acid,
d) optionally up to 10% by weight of further copolymerizable monomers,
characterized in that the ratio of the linear acrylic esters to the branched acrylic esters is in the range from 1:6 to 10:1 mass fractions.

13 Claims, 1 Drawing Sheet

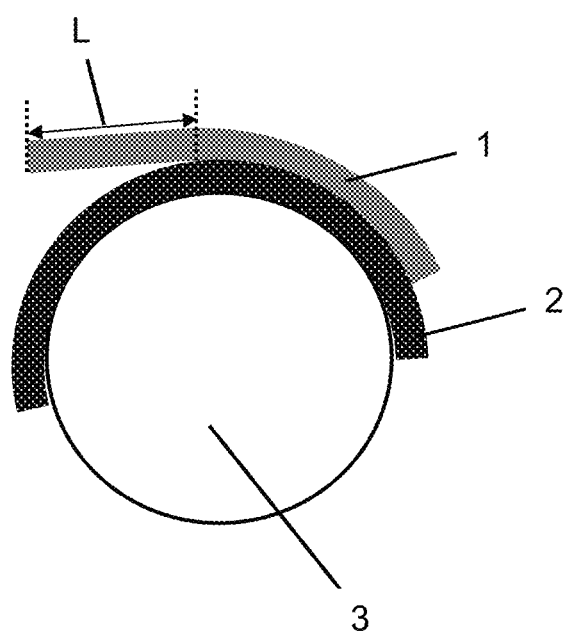

PRESSURE-SENSITIVE ADHESIVES FOR BONDING PRINTING PLATES

This application is a divisional of U.S. patent application Ser. No. 12/717,183, filed Mar. 4, 2010, now allowed, which claims priority of German Patent Application No. 10 2009 011 482.3, filed Mar. 6, 2009, the entire contents of which patent applications are incorporated herein by reference.

The invention relates to a crosslinked pressure-sensitive adhesive based on a polymer obtainable by copolymerizing linear and branched acrylic esters and also acrylic acid, and to the use of a pressure-sensitive adhesive of this kind for bonding flexible printing plates.

BACKGROUND OF THE INVENTION

Within the printing industry there is a variety of techniques known for transferring designs to paper, for example, by means of print originals. One possibility is that known as flexographic printing.

In the flexographic printing process, flexible printing plates are bonded to printing cylinders or printing sleeves. Such plates are composed, for example, of a polyethylene terephthalate film (PET film) to which is applied a layer of a photopolymer, into which the corresponding print relief can be introduced by exposure to light. In this case the bonding of the plate to the printing cylinder or printing sleeve is via the PET film.

For the bonding operation it is usual to use double-sided pressure-sensitive adhesive tapes, which are subject to very exacting requirements. For the printing operation, the pressure-sensitive adhesive tape is required to have a certain hardness, but also a certain elasticity. These properties must be set very precisely, so that the resulting printed image, in accordance with the requirements, delivers the desired result. Exacting requirements are likewise imposed on the pressure-sensitive adhesive, since the bond strength must likewise be sufficient for the printing plate not to detach from the double-sided pressure-sensitive adhesive tape, or the pressure-sensitive adhesive tape from the cylinder or sleeve. This applies even at increased temperatures of 40 to 60° C. and at relatively high printing speeds. Besides this characteristic, however, the pressure-sensitive adhesive is also required to posses reversible adhesion properties, in order to be able to detach again from the printing plates after the printing operations (for such redetachability, it must be possible to undo not only the adhesive bond of the pressure-sensitive adhesive tape to the printing cylinder or printing sleeve but also the adhesive bond to the plate, without residue, in order to ensure that both components can be used again). This detachability ought to exist even after bonding over a relatively long time period (up to 6 months). It is desirable, moreover, for the pressure-sensitive adhesive tape, and particularly the printing plate, to be removable without suffering destruction, in other words without great expenditure of force, since the printing plates are usually used more than once. Moreover, there should be no residues remaining on the printing plate or on the cylinder or sleeve. In summary, therefore, the requirements imposed on the double-sided pressure-sensitive adhesive tapes suitable for this utility are very exacting.

Pressure-sensitive adhesives (PSAs) contemplated include, for example, those based on natural rubber, as documented by EP 760 389 A, for instance. For the stated end utility, however, pressure-sensitive adhesive tapes are also used that comprise polyacrylate-based PSAs. For example, WO 03/057497 A describes a block copolymer-based acrylate PSA for the stated end application. WO 2004/067661 A discloses a pressure-sensitive adhesive tape featuring a PSA based on a soft acrylic monomer ($T_g < -30°$ C.) to an extent of at least 49.5% by weight, at least one hard, cyclic or linear (meth)acrylic ester monomer ($T_g \geq 30°$ C.) to an extent of at least 10% by weight, and also functionalized, hard (meth) acrylic acid/ester monomers ($T_g \geq 30°$ C.) to an extent of at least 0.5% by weight, the PSA being prepared in a two-stage process. It is reported that the latter of the stated components, which includes acrylic acid, may be present in fractions of up to 10% by weight. There is no teaching, however, of how this component, if selected as acrylic acid, might be copolymerized in correspondingly high fractions with retention of the requisite pressure-sensitive adhesive properties, or of the extent to which high fractions of acrylic acid would affect the pressure-sensitive adhesive properties. Correspondingly, all of the examples given show an acrylic acid fraction of only 2% by weight in the PSA, corresponding to the expectations of the effect of hard monomers on the requisite application properties (on this point see later on below). The solvent resistance of the resulting materials is not addressed.

Associated with the PSAs known from the prior art, however, is a problem. Although they are indeed very suitable for an operationally reliable bond of the printing plates to printing cylinders and to printing sleeves, and have good redetachability thereafter, there is nevertheless failure of the adhesive bond in contact with solvents that may penetrate the bonded joint. This is the case particularly when the bonded printing plates are to be cleaned to remove the printer's ink. The usual way of achieving this is to use the solvents, which also serve as solvents for the inks per se, in large quantities for the washing and detaching of the inks from the plates. Inevitably in such operations, however, there is an undermining of the edges of the bond of the plate on the pressure-sensitive adhesive tape. This causes detachment of the plates, since the adhesives of the pressure-sensitive adhesive tape lose the required adhesion to the plate. The flaps that this produces prevent further printing operations by causing the printing ink to smear, if not indeed leading to mechanical problems with the plate flaps in the printing apparatus and hence to system failures. In practice, therefore, printing plates that are mounted with prior-art adhesives have to be protected from the solvent by sealing of the plate edges with single-sided pressure-sensitive adhesive tapes or with liquid adhesives or hot melt adhesives.

This additional sealing operation entails a significant extra expense and effort, and harbours the risk of damaging the expensive printing plates on demounting, particularly when liquid or hot melt adhesives are used.

BRIEF DESCRIPTION OF THE DRAWING

FIG. 1 illustrates a printing plate bonded to a printing cylinder with an adhesive assembly, with a portion of the printing plate lifting off of the printing cylinder.

It therefore appears necessary to develop a pressure-sensitive adhesive which does not have the disadvantages described in the prior art and which accomplishes the described application without additional sealing of the plate edges.

It is an object of the invention to offer a pressure-sensitive adhesive which, even under the influence of solvents, ensures effective and secure bonding, particularly to PET (polyethylene terephthalate), and yet is redetachable even after a prolonged time. The pressure-sensitive adhesive is preferably to be suitable more particularly for the bonding of printing plates, with the printing plates having no tendency, or a significantly reduced tendency, towards edge lifting under the influence of solvents.

SUMMARY OF THE INVENTION

Surprisingly it has been possible to achieve this object with a pressure-sensitive adhesive which has an acrylic acid fraction of at least 8% by weight and also has a defined ratio of copolymerized linear acrylic esters to branched, non-cyclic acrylic esters.

Pressure-sensitive adhesives are, in particular, polymeric materials which—if desired as a result of suitable additization with further components, such as tackifier resins, for example—are permanently tacky and permanently adhesive at the application temperature (at room temperature unless otherwise defined) and adhere to a multiplicity of surfaces on contact, particularly with instantaneous adhesion (referred to as "tack"). Even at the application temperature, without activation by solvent or by heat—but usually by influence by a greater or less pressure—they have the capacity to wet a substrate to which bonding is to take place, and do so to an extent sufficient to allow interactions to develop, between the material and the substrate, that are sufficient for adhesion. Influencing parameters essential for this purpose include the pressure and the contact time. The particular properties of the PSAs derive in particular, among other things, from their viscoelastic properties.

PSAs may in principle be prepared on the basis of polymers of various chemical types. The pressure-sensitive adhesion properties are influenced by factors including the nature and the proportions of the monomers used in the polymerization of the polymers on which the PSA is based, their average molar mass and molar mass distribution, and the nature and amount of additives to the PSA, such as tackifier resins, plasticisers and the like.

In order to obtain the viscoelastic properties, the monomers on which the PSA's parent polymers are based, and also any further components of the PSA that are present, are selected in particular such that the PSA has a glass transition temperature $T_g$ below the application temperature (usually, in other words, below room temperature) [the glass transition temperature here is determined usually under quasi-steady-state conditions, advantageously by means of dynamic scanning colorimetry (DSC); DIN 53765. Unless indicated otherwise, the glass transition temperatures in this specification relate to the measurement to DIN 53765].

Beneath the glass transition temperature $T_g$, the PSAs exhibit brittle-elastic (glass like-amorphous or partially crystalline) behaviour; here it is not possible for pressure-sensitive adhesive behaviour to develop. Above the glass transition temperature $T_g$, the materials soften to a greater or lesser extent with increasing temperature, according to their composition, and, within a particular temperature range, adopt the viscosity values that are suitable for the pressure-sensitive adhesive properties, before becoming, at even higher temperatures, too highly mobile still to posses pressure-sensitive adhesive properties (unless they undergo decomposition beforehand).

Another criterion for suitability as a PSA is that of cohesion. The polymer material must have sufficient cohesion to allow the adhesion to be mediated on bonding, and not to flow from the bondline. By means of suitable cohesion-enhancing measures, such as crosslinking reactions (formation of bridge-forming links between the macromolecules), for example, it is possible to adjust, enlarge and/or shift the temperature range within which a polymer material exhibits pressure-sensitive adhesive properties. The application range of the PSA can therefore be optimized by making an adjustment between fluidity and cohesion of the material.

Acrylic acid is a "hard" comonomer; the higher the fraction of acrylic acid in the material, the higher the anticipated glass transition temperature of the copolymer. This has a greater effect on the suitability of the copolymer as a base polymer for PSAs, and especially on the mounting behaviour of the PSAs. Mounting behaviour for the purposes of this specification is understood to refer in particular to the instantaneous adhesion when an adhesive tape is bonded to a substrate by means of the pressure-sensitive adhesive layer in question; for good mounting behaviour, accordingly, brief pressing-on with low force is required to lead to effective and reliable adhesion.

With the copolymerization of very large amounts of acrylic acid, it is easy to enter the range of such high glass transition temperatures in the copolymer that these temperatures come too close to the application temperature (i.e. room temperature in particular) or even exceed said temperatures, thereby ruling out its use as a base polymer for PSAs.

Attempts are made to compensate this effect by using, as further comonomers, soft monomers, in other words monomers whose glass transition temperatures are low, in order to force the glass transition temperature of the copolymer back down again.

For the calculation of the glass transition temperatures of comonomers, the prior art describes the possibility of employing the Fox equation (E1) (c.f. T. G. Fox, Bull. Am. Phys. Soc. 1 (1956) 123):

$$\frac{1}{T_g} = \sum_n \frac{w_n}{T_{g,n}} \tag{E1}$$

In equation (E1), n represents the serial number of the monomers employed, $w_n$ the mass fraction of the respective monomer n (% by weight) and $T_{g,n}$ the respective glass transition temperature of the homopolymer of the respective monomer n in K.

This states that the glass transition temperature changes directly in line with the mass fraction of the comonomers used in each case. According to this equation, therefore, a person skilled in the art would expect to be able to achieve the furthest reduction in glass transition temperature by copolymerizing the acrylic acid only with the kind of monomer whose corresponding homopolymer has the lowest glass transition temperature, and hence obtaining the copolymer with the best mounting behaviour. Effective mounting behaviour for the purposes of this specification is understood to mean effective instantaneous adhesion when the plate is mounted on the adhesive tape (the double-sided adhesive tape being bonded by its other adhesive surface as well to a printing cylinder or printing sleeve, in other words a curved surface); brief pressing-on at low force, accordingly, is to lead to effective adhesion of the plate to the adhesive tape.

Surprisingly it has been found that the predicted effect is not a satisfactory description of the reality. It has been observed that a copolymer having a high amount of acrylic acid exhibits the best mounting behaviour when, as further comonomers, there are at least one linear "soft" acrylic ester and at least one branched "soft" acrylic ester in not insignificant mass fractions.

As a result of increasing the acrylic acid fraction in polymer systems with nevertheless outstanding mounting properties, success has been achieved in offering a PSA system which effects outstanding bonding of printing plates to printing cylinders and printing sleeves, which does not exhibit any tendency, or exhibits only a very small tendency, towards edge lifting, even under the influence of relatively large amounts of solvents, and, nevertheless, has outstanding redetachability, meaning that the PSA layer (typically as a layer of an adhesive tape used for the bonding operation) can be removed from the printing plate even after a prolonged period of bonding, without residues of PSA remaining on the bonded substrates.

The invention accordingly provides a crosslinked pressure-sensitive adhesive which comprises one or more base polymer components, the base component(s) being obtainable by free-radical copolymerization of the following monomers:

linear acrylic esters having 2 to 10 C atoms in the alkyl radical, branched, non-cyclic acrylic esters having a glass transition temperature $T_g$ (based on the DSC measurement to DIN 53765) of not more than −20° C., 8% to 15% by weight of acrylic acid, less than 10% by weight of further copolymerizable monomers;

in accordance with the invention the ratio of the linear acrylic esters to the branched acrylic esters is in the range from 1:6 to 10:1 mass fractions.

DETAILED DESCRIPTION

In one particularly preferred embodiment of the invention, the PSA comprises only one base polymer component, and with particular advantage the base polymer component is confined to components a) to c), and so the base polymer component is not based on any further copolymerized monomers apart from linear acrylic esters having 2 to 14 C atoms in the alkyl radical, branched, non-cyclic acrylic esters having a glass transition temperature $T_g$ of not more than −20° C. and acrylic acid, in the weight fractions stated above.

A feature of the PSA of the invention is that it is possible to do without the presence of components and comonomers—especially those which are plasticizing—other than those stated. Thus, for example, it is possible to do entirely without comonomers having cyclic hydrocarbon building blocks.

Linear acrylic esters having 2 to 10 C atoms in the alkyl radical are ethyl acrylate, n-propyl acrylate, n-butyl acrylate, n-pentyl acrylate, n-hexyl acrylate, n-heptyl acrylate, n-octyl acrylate, n-nonyl acrylate and n-decyl acrylate.

Branched, non-cyclic acrylic esters having a glass transition temperature $T_g$ (based on the DSC measurement in accordance with DIN 53765) of not more than −20° C. are those acrylic esters whose homopolymers have a glass transition temperature $T_g$ of not more than −20° C. As branched, non-cyclic acrylic esters of this kind it is preferred to use C4-C12 alkyl esters of acrylic acid which are preferably selected from the group consisting of 2-ethylhexyl acrylate (EHA), 2-propylheptyl acrylate, isooctyl acrylate, isobutyl acrylate, isoamyl acrylate and/or isodecyl acrylate.

It has been found to be particularly advantageous in accordance with the invention if use is made as branched, non-cyclic acrylic esters of 2-ethylhexyl acrylate (EHA), 2-propylheptyl acrylate and/or isooctyl acrylate (to be more precise: the acrylic esters for which the alcohol component can be traced back to a mixture of primary isooctanols, in other words to those alcohols which are obtainable from an isoheptene mixture by hydroformylation and subsequent hydrogenation).

A very preferred PSA is one whose base polymer derives from precisely one monomer of kind a), one monomer of kind b) and acrylic acid, with particular preference being given to selection of butyl acrylate as monomer of kind a) and 2-ethylhexyl acrylate as monomer of kind b).

The fraction of acrylic acid in the base polymer component provides an excellent means of adjusting suitability in the desired area of application. As the acrylic acid fraction goes up there is a reduction in quality in mounting behaviour at low temperatures (temperatures below room temperature), but a rise in quality with regard to edge lifting under the influence of solvent (defined below as solvent resistance; quantifiable by means of Test Method 2: Solvent Resistance).

An acrylic acid fraction of 7% to 10% by weight, preferably of at least 9% by weight, still exhibits very good mounting behaviour, and satisfactory solvent resistance, at low temperatures (temperatures below room temperature; here, for example, 15° C.). If, with the ratio of linear acrylic esters (butyl acrylate for example) to branched non-cyclic acrylic ester (2-ethylhexyl acrylate for example) remaining the same, the acrylic acid fraction is increased to at least 10%, then the edge lifting behaviour can be improved still further, albeit with a fall-off in the mounting behaviour at low temperatures, though still remaining excellent at temperatures around room temperature and above. Thus for example, with 11% by weight of acrylic acid, a satisfactory mounting behaviour at reduced temperatures (15° C., for example) and good solvent resistance are still found. If the assembly behaviour at low temperatures is not so important, then it is possible through a further increase in the acrylic acid fraction, for instance to 12% by weight (still sufficient assembly behaviour at low temperatures) or to 13% by weight (particularly for assembly at elevated temperatures), to observe outstanding solvent resistance.

As further copolymerizable monomers, used optionally at up to 10% by weight, it is possible, without particular restriction, to use all of the free-radically polymerizable monomers or monomer mixtures, containing C=C double bonds, that are known to a person skilled in the art. Monomers for this purpose that are cited by way of example include the following:

methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxypolyethylene glycol methacrylate 350, methoxypolyethylene glycol methacrylate 500, propylene glycol monomethacrylate, butoxydiethylene glycol methacrylate, ethoxytriethylene glycol methacrylate, octafluoro-pentyl acrylate, octafluoropentyl methacrylate, 2,2,2-trifluoroethyl methacrylate, 1,1,1,3,3,3,-hexafluoroisopropyl acrylate, 1,1,1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropyl acrylamide, dimethylaminopropyl methacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether and vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, macromonomers such as 2-polystyrene-ethyl methacrylate (molecular weight MW from 4000 to 13 000 g/mol), poly(methyl methacrylate)-ethyl methacrylate (MW from 2000 to 8000 g/mol).

The monomers cited by way of example can advantageously also be selected such that they contain functional groups which support subsequent radiation crosslinking (as for example by electron beams, UV).

It has been found, furthermore, when varying the ratio of linear acrylic ester to branched non-cyclic acrylic ester, that a minor fraction either of linear acrylic ester component or of branched acrylic ester component is unacceptable, since the mounting behaviour at low temperatures is unsatisfactory and even at room temperature does not adopt good values.

In accordance with the invention, the ratio of the linear acrylic esters to the branched acrylic esters is in the range from 1:5 to 9:1, preferably in the range of 1:3 to 5:1 more particularly in the range from 1:2 to 4:1 mass fractions, in order to ensure sufficient mounting behaviour at room temperature or higher.

With particular preference the ratio of the linear acrylic esters to the branched acrylic esters selected is in the range from 1.5:1 to 3.5:1, more particularly 2:1 to 3:1 mass fractions, since it is here that the best mounting behaviour is found even while still at low temperatures (15° C., for example). PSAs of this kind, then, can still be used outstandingly in the low-temperature range as well.

The above remarks (acrylic acid fraction, ratio of the components to one another) also apply in principle to the other linear acrylic esters and branched non-cyclic acrylic esters that are given as being advantageous in accordance with the invention.

In one advantageous embodiment of the PSA of the invention, the base polymer component accounts for at least 90%, preferably at least 95%, more preferably at least 98% by weight of the PSA, or, where there is more than one base polymer present, the base polymer components in total account for at least 90%, preferably at least 95%, more preferably at least 98% by weight of the PSA. In one particularly advantageous embodiment the PSA is composed exclusively of the crosslinked base polymer component or of the crosslinked base polymer components.

The crosslinking of the PSA prevents cohesive failure in application, in other words a rupture within the layer of adhesive as such. This crosslinking may be accomplished in accordance with methods that are familiar per se to a person skilled in the art.

As a result of the high acrylic acid fraction, the PSA has a high fraction of polar groups. Particularly on polar surfaces such as polyethylene terephthalate, for example, it is therefore anticipated, owing to polar-polar interactions, that there will over time be peel increase on the part of the PSA, something which would normally lead to a strengthening of the bond to the substrate and hence to a less easy redetachability. Surprisingly, however, it has been found that, even after relatively long periods of bonding, the PSA can still be parted easily and without residue from the printing plate, and so this requirement as well is met flawlessly by the PSA of the invention.

The invention further provides double-sided adhesive tapes having two outer layers of pressure-sensitive adhesive, of which at least the layer that serves to bond the printing plate is realized by means of a pressure-sensitive adhesive of the invention. The construction of the adhesive tape may otherwise conform to those of the prior art, of the type, for instance, shown in WO 2004/067661 A in FIG. 1 (see therein also the associated description from page 16 line 35 ff). The other adhesive tape designs of the kind known from the prior art particularly for the bonding of printing plates to printing cylinders or printing sleeves, however, can also be realized in accordance with the invention.

On the basis of experimental investigations, the purpose of the text below is to set out the advantages of the PSAs of the invention, without wishing, through the choice of experiments depicted, to impose any unnecessary restriction on the subject matter of the invention.\

Production of Specimens

Example 1

A 2 L glass reactor conventional for free-radical polymerizations was charged with 20.0 g of acrylic acid, 99.2 g of 2-ethylhexyl acrylate, 280.8 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 2

A 2 L glass reactor conventional for free-radical polymerizations was charged with 28.0 g of acrylic acid, 97.2 g of 2-ethylhexyl acrylate, 274.8 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 3

A 2 L glass reactor conventional for free-radical polymerizations was charged with 36.0 g of acrylic acid, 95.2 g of 2-ethylhexyl acrylate, 268.8 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 4

A 2 L glass reactor conventional for free-radical polymerizations was charged with 44.0 g of acrylic acid, 93.2 g of 2-ethylhexyl acrylate, 254.8 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 5

A 2 L glass reactor conventional for free-radical polymerizations was charged with 48.0 g of acrylic acid, 92.0 g of 2-ethylhexyl acrylate, 260.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 6

A 2 L glass reactor conventional for free-radical polymerizations was charged with 52.0 g of acrylic acid, 90.8 g of 2-ethylhexyl acrylate, 257.2 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi(2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 7

A 2 L glass reactor conventional for free-radical polymerizations was charged with 48.0 g of acrylic acid, 352.0 g of 2-ethylhexyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi(2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 8

A 2 L glass reactor conventional for free-radical polymerizations was charged with 48.0 g of acrylic acid, 292.0 g of 2-ethylhexyl acrylate, 60.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi(2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 9

A 2 L glass reactor conventional for free-radical polymerizations was charged with 48.0 g of acrylic acid, 236.0 g of 2-ethylhexyl acrylate, 116.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi(2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 10

A 2 L glass reactor conventional for free-radical polymerizations was charged with 48.0 g of acrylic acid, 172.0 g of 2-ethylhexyl acrylate, 180.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 11

A 2 L glass reactor conventional for free-radical polymerizations was charged with 48.0 g of acrylic acid, 112.0 g of 2-ethylhexyl acrylate, 240.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 12

A 2 L glass reactor conventional for free-radical polymerizations was charged with 48.0 g of acrylic acid, 72.0 g of 2-ethylhexyl acrylate, 280.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 13

A 2 L glass reactor conventional for free-radical polymerizations was charged with 48.0 g of acrylic acid, 32.0 g of 2-ethylhexyl acrylate, 320.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi (2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Example 14

A 2 L glass reactor conventional for free-radical polymerizations was charged with 48.0 g of acrylic acid, 352.0 g of butyl acrylate, 150.0 g of acetone and 150.0 g of special-boiling-point spirit 60/95. After nitrogen gas had been passed through it for 45 minutes of stirring, the reactor was heated to 58° C. and 0.16 g of 2,2'-azodi(2-methylbutyronitrile) (Vazo 67, DuPont) in solution in 10 g of acetone was added. Subsequently the external heating bath was heated to 75° C. and the reaction was carried out constantly with evaporative cooling (external temperature 75° C.). After a reaction time of one hour, 0.24 g of 2,2'-azodi(2-methylbutyronitrile) (Vazo 67, DuPont) in solution in 10 g of acetone was added. After three hours, the batch was diluted with 45 g of acetone and 45 g of special-boiling-point spirit 60/95. After a reaction time of five hours and 30 minutes, 0.60 g of bis(4-tert-butylcyclohexanyl) peroxydicarbonate (Perkadox 16, Akzo Nobel) in solution in 10 g of acetone was added. After a reaction time of 7 hours, 0.60 g of bis(4-tert-butylcyclohexanyl) peroxydicarbonate (Perkadox 16, Akzo Nobel) in solution in 10 g of acetone was added. After a reaction time of ten hours, the batch was diluted with 45 g of acetone and 45 g of special-boiling-point spirit 60/95. After a reaction time of 24 h, the reaction was discontinued and the batch was cooled to room temperature.

Subsequently the polymer was diluted with a 1:1 mixture of acetone and special-boiling-point spirit 60/95 to a solids content of 30%, and blended with 1 g of aluminium(III) acetylacetonate. The properties of the resulting PSA were evaluated on a double-sided adhesive assembly.

Comparative Example R 1

Synthetic Rubber PSA 20 parts by weight of Kraton® D 1118 (styrene/butadiene/styrene triblockcopolymer, about 76% by weight diblock, block polystyrene content: 31% by weight, Kraton Polymers), 40 parts by weight of Kraton® D 1101 (styrene/butadiene/styrene triblockcopolymer, about 18% by weight diblock, block polystyrene content: 31%, Kraton Polymers), 30 parts by weight of Dercolyte® A 115 (Alpha-Pinene resin, softening temperature: about 115° C., DRT) and 10 parts by weight of Wingtack® 10 (liquid hydrocarbon resin, Goodyear) were dissolved in a 50:50 mixture of toluene and benzene, to give a solids content of 40%. As an ageing inhibitor, 0.5 part of Irganox® 1010 (sterically hindered Phenol; Ciba Additive) and 0.5 part of Tinuvin® P (commercial UV-Absorber, Ciba Additive) as a UV absorber were added. The properties of the resulting PSA were evaluated on a double-sided adhesive assembly.

Comparative Example R 2

PSA Corresponding to Example 1 from WO 2004/067661 A

A 2 L glass reactor conventional for free-radical polymerizations was charged with 8 g of acrylic acid, 272 g of 2-ethylhexyl acrylate, 120 g of isobornyl acrylate and 266 g of 1:1 acetone:special-boiling-point spirit 60/95. After nitrogen gas had been passed through it for 45 minutes of stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly with evaporative cooling (external temperature 75° C.). After a reaction time of one hour, a further 0.2 g of AIBN in solution in 10 g of acetone was added. After a reaction time of five hours, 0.8 g of bis(4-tert-butylcyclohexanyl) peroxydicarbonate (Perkadox 16™, Akzo Nobel) in solution in 10 g of acetone was added. After six hours the batch was diluted with 100 g of special-boiling-point spirit 60/95. After a reaction time of 7 hours, 0.8 g of bis(4-tert-butylcyclohexanyl) peroxydicarbonate (Perkadox 16™, Akzo Nobel) in solution in 10 g of acetone was added. After ten hours, the batch was diluted with 150 g of special-boiling-point spirit 60/95. After a reaction time of 24 h, the reaction was discontinued and the batch was cooled to room temperature. Subsequently the polyacrylate was blended with 0.6% by weight of aluminium(III) acetylacetonate (3% strength solution, acetone) and diluted with special-boiling-point spirit 60/95 to a solids content of 30%. The properties of the resulting PSA were evaluated on a double-sided adhesive assembly.

Production of the Double-Sided PSA Tape Assembly:

The PSA from examples 1-14, R 1 and R 2 was first coated from solution onto a PET film 23 μm thick which had been etched with trichloroacetic acid on both sides. After drying for 15 minutes at 120° C., the adhesive coat weight was 50 g/m$^2$. On the adhesive side, the coated film was laminated with a double-sided siliconized PET film (liner material). Subsequently, via a transfer carrier, a commercial acrylate adhesive was laminated at a coat weight of 20 g/m$^2$ onto the uncoated side of the etched PET film of the assembly, and a PE-EVA foam having a thickness of 500 μm and a density of 270 kg/m$^3$ was laminated on. This foam carrier was then laminated by a transfer carrier with a commercial acrylate PSA at a coat weight of 50 g/m$^2$ onto the uncoated side of the preceding assembly (exposed pressure-sensitive acrylate layer).

Test Method 1: Mounting Behaviour

Specimens measuring 250 mm×160 mm were cut from the double-sided adhesive assembly under investigation. These specimens were bonded, with the commercially customary, exposed pressure-sensitive acrylate layer, to a steel cylinder having a diameter of 110 mm, in such a way that the shorter edges of the specimens were aligned in the longitudinal direction of the cylinder. The liner material was then removed, leaving the layer of the inventive PSA exposed. Atop the adhesive assembly specimens thus bonded, a full-area exposed printing plate from DuPont Cyrel HOS, with dimensions of 210 mm length×120 mm width×2.54 mm thickness, was adhered to the inventive PSA in such a way that 20 mm of the underlying adhesive assembly protruded at each edge (centred application to the adhesive assembly specimen).

The procedure of applying the printing plate involved one of the shorter edges of the plate (transverse edge) being applied at a distance of 20 mm from one of the shorter edges of the adhesive assembly specimen, parallel to that edge, to the specimen. Then, starting from this edge, the plate was rolled on using a plastic roller (width 100 mm, diameter 30 mm, Shore hardness A 45). The rolling movement took place in the longitudinal direction of the printing cylinder and perpendicularly, and was performed continuously from each longitudinal edge of the plate to the opposite longitudinal edge of the plate, and back again. The rolling speed was 10 m/min in the transverse direction. At the same time the printing cylinder rotated with a superficial velocity of 0.6 m/min, and so the plastic roller relative to the printing plate described a zig-zag movement in the direction of the second transverse edge of the plate. The procedure was ended when the plate had been pressed on over its whole area. The variable used was the minimum pressing force of the plastic roller needed to attach the plate over its full area to the adhesive assembly without any observation of edge lifting.

The test was carried out at three different temperatures (15° C., 25° C., 35° C.) with a relative atmospheric humidity in each case of 50±5%.

Evaluation Scheme:

| Pressing force required | Evaluation |
| --- | --- |
| <50 N | ++ |
| 50 N to <60 N | + |
| 60 N to <70 N | 0/+ |
| 70 N to <80 N | 0 |
| 80 N to <90 N | 0/− |
| 90 N to <100 N | − |
| 100 N or more | −− |

Test Method 2: Solvent Resistance

The mounting of the test specimens took place as specified in test method 1 (mounting behaviour), with the corresponding pressing force needed to mount the plate over its full area and without edge lifting. The orientation of the printing cylinder was such that both short edges of the bonded plate were situated at a level above the axis of rotation of the cylinder (exposed area of the cylinder oriented upwards).

Using a pipette, a solvent mixture (⅛ ethyl acetate/⅛ n-propanol/⁶⁄₈ ethanol) was applied to both edges for one minute, so that the edges were continually under the influence of solvent. The amount of solvent applied was just enough for both edges to be permanently wetted with solvent (test conditions: 25° C., 50±5% relative atmospheric humidity).

When the wetting time had expired, the cylinder was placed onto one of its edges, allowing excess solvent to run off.

It was determined by inspection whether the short edges of the plate had lifted from the adhesive assembly. One measure of this edge lifting was the measured length L of the section of the printing plate that was no longer adhered (the lifted printing plate section), measured 60 min after the end of the wetting period in the tangential direction, and measured from the exposed end up to the first point where the bond was still intact (cf. FIG. 1: 1=printing plate, 2=adhesive assembly, 3=printing cylinder, L=length of the lifted printing plate section).

Evaluation Scheme:

| Edge lifting after solvent influence | Evaluation |
| --- | --- |
| <5 mm | ++ |
| to <10 mm | + |
| o <15 mm | 0/+ |
| o <20 mm | 0 |
| o <25 mm | 0/− |
| o <30 mm | − |
| m or more | −− |

With the adhesively bonded assembly samples, a series of measurements were conducted in order to determine the mounting behaviour at different temperatures and also the solvent resistance (edge lifting behaviour under solvent influence) as a function of the acrylic acid fraction (examples 1 to 6; see Table 1), and also a further series of measurements to test the influence of the ratio of linear acrylic ester to branched acrylic ester on the stated properties (examples 5 and 7 to 14, see Table 2). For the comparative samples (R1 and R2) the mounting behaviour at different temperatures and also the solvent resistance were investigated (see Table 3).

Effect of Acrylic Acid-(AA-) Fraction with constant ratio of 2-ethylhexyl acrylate (EHA) to butyl acrylate (BA) (about 1:3)

TABLE 2

| Example | Weight percent AA:EHA:BA | Mounting behaviour (15° C.) (Test method 1) | Mounting behaviour (25° C.) (Test method 1) | Mounting behaviour (35° C.) (Test method 1) | Edge lifting after solvent influence (Test method 2) |
| --- | --- | --- | --- | --- | --- |
| 7 | 12:88:0 | −− | 0 | ++ | ++ |
| 8 | 12:73:15 | −− | + | ++ | ++ |
| 9 | 12:59:29 | − | ++ | ++ | ++ |
| 10 | 12:43:45 | − | ++ | ++ | ++ |
| 11 | 12:28:60 | 0 | ++ | ++ | ++ |
| 5 | 12:23:65 | 0 | ++ | ++ | ++ |
| 12 | 12:18:70 | − | ++ | ++ | ++ |
| 13 | 12:8:80 | − | + | ++ | ++ |
| 14 | 12:0:88 | −− | 0 | ++ | ++ |

Effect of the ratio of 2-ethylhexyl acrylate (EHA) to butyl acrylate (BA) at a constant mass fraction of acrylic acid (AA) (12% by weight)

TABLE 3

| Example | Mounting behaviour (15° C.) (Test method 1) | Mounting behaviour (25° C.) (Test method 1) | Mounting behaviour (35° C.) (Test method 1) | Edge lifting after solvent influence (Test method 2) |
| --- | --- | --- | --- | --- |
| R 1 | + | ++ | ++ | −− |
| R 2 | 0/+ | ++ | ++ | −− |

Result of Investigations on Comparative Samples

A pressure-sensitive adhesive which proved to be particularly advantageous was an adhesive provided by a base polymer derived from 12% by weight of acrylic acid and from butyl acrylate and 2-ethylhexyl acrylate, with 2-ethylhexyl acrylate and butyl acrylate being present in a ratio of 1:2 to 1:3.

It was also found that not only the comparative PSA R1, based on synthetic rubber, but also the comparative adhesive R2, having an acrylic acid fraction of only 2% by weight, exhibit unacceptable solvent resistance.

The invention claimed is:

1. Crosslinked pressure-sensitive adhesive comprising at least one polymer component obtained by free-radical copolymerization of the following monomers exclusively:
   a) linear acrylic esters having 2 to 10 C atoms in the alkyl radical,
   b) branched, non-cyclic acrylic esters having a glass transition temperature $T_g$, of not more than −20° C., and

TABLE 1

| Example | Weight percent AA:EHA:BA | Mounting behaviour (15° C.) (Test method 1) | Mounting behaviour (25° C.) (Test method 1) | Mounting behaviour (35° C.) (Test method 1) | Edge lifting after solvent influence (Test method 2) |
| --- | --- | --- | --- | --- | --- |
| 1 | 5:24.8:70.2 | ++ | ++ | ++ | − |
| 2 | 7:24.3:68.7 | ++ | ++ | ++ | 0 |
| 3 | 9:23.8:67.2 | ++ | ++ | ++ | 0/+ |
| 4 | 11:23.3:65.7 | 0/+ | ++ | ++ | + |
| 5 | 12:23:65 | 0 | ++ | ++ | ++ |
| 6 | 13:22.7:64.3 | −− | − | ++ | ++ | c) acrylic acid, in an amount of from 11% to 15% by weight, based on the total weight of monomers,
wherein the mass ratio of the linear acrylic esters to the branched acrylic esters is in the range from 1:6 to 10:1.

2. Pressure-sensitive adhesive according to claim 1, said at least one polymer component makes up at least 90% by weight of the pressure-sensitive adhesive.

3. The pressure-sensitive adhesive of claim 2, wherein said at least one polymer component makes up at least 95% by weight of the pressure-sensitive adhesive.

4. The pressure-sensitive adhesive of claim 3, wherein said at least one polymer component makes up at least 98% by weight of the pressure-sensitive adhesive.

5. Pressure-sensitive adhesive according to claim 1, wherein the mass ratio of the linear acrylic esters to the branched acrylic esters is in the range of 1:5 to 9:1.

6. Pressure-sensitive adhesive according to claim 5, wherein the mass ratio of the linear acrylic esters to the branched acrylic esters is from 1.5:1 to 3.5:1.

7. The pressure-sensitive adhesive of claim 5, wherein said mass ratio of the linear acrylic esters to the branched acrylic esters is from 2:1 to 3:1.

8. The pressure sensitive adhesive of claim 5, wherein said mass ratio of the linear acrylic esters to the branched acrylic esters is from 1:2 to 4:1.

9. The crosslinked pressure-sensitive adhesive of claim 1, wherein said monomers further comprise up to 10% by weight of additional copolymerizable monomers.

10. Pressure-sensitive adhesives according to claim 1, wherein said liner acrylic ester is butyl acrylate and said branched non-cyclic acrylic ester is 2-ethylhexyl acrylate.

11. A method for bonding flexible printing plates to curved surfaces which comprises bonding said flexible printing plates to said curved surfaces with the pressure-sensitive adhesive of claim 1.

12. Method of claim 11, wherein said pressure-sensitive adhesive has a solvent resistance that corresponds to edge lifting of less than 10 mm under the influence of solvent.

13. The method of claim 12, wherein said edge lifting is less than 5 mm.

* * * * *